United States Patent
Martin et al.

(10) Patent No.: US 12,018,614 B2
(45) Date of Patent: Jun. 25, 2024

(54) DIHYDROGEN SUPPLY SYSTEM FOR AN AIRCRAFT ENGINE

(71) Applicant: Airbus Operations SAS, Toulouse (FR)

(72) Inventors: Pierre-Olivier Martin, Toulouse (FR); Lionel Czapla, Toulouse (FR); Mathieu Belleville, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/356,662

(22) Filed: Jul. 21, 2023

(65) Prior Publication Data

US 2024/0026813 A1 Jan. 25, 2024

(30) Foreign Application Priority Data

Jul. 25, 2022 (FR) .................................. 2207594

(51) Int. Cl.
| | |
|---|---|
| *F02C 3/22* | (2006.01) |
| *B64D 37/30* | (2006.01) |
| *B64D 37/34* | (2006.01) |
| *F02C 7/224* | (2006.01) |
| *F02C 7/232* | (2006.01) |

(52) U.S. Cl.
CPC ............... *F02C 3/22* (2013.01); *B64D 37/30* (2013.01); *B64D 37/34* (2013.01); *F02C 7/224* (2013.01); *F02C 7/232* (2013.01)

(58) Field of Classification Search
CPC ........ B64D 37/00; B64D 37/30; B64D 37/34; F02C 3/22; F02C 7/22; F02C 7/224; F02C 7/236
See application file for complete search history.

(56) References Cited

U.S. PATENT DOCUMENTS

| | | |
|---|---|---|
| 2014/0174083 A1 | 6/2014 | Gerstler et al. |
| 2019/0153953 A1* | 5/2019 | Niergarth ............... F02C 7/141 |
| 2022/0163170 A1 | 5/2022 | Bensadoun et al. |

FOREIGN PATENT DOCUMENTS

| | | |
|---|---|---|
| FR | 3114355 A1 | 3/2022 |
| WO | 2020188194 A1 | 9/2020 |
| WO | 2022106053 A1 | 5/2022 |

OTHER PUBLICATIONS

French Search Report for corresponding French Patent Application No. 2207594 dated Feb. 15, 2023; priority document.

* cited by examiner

*Primary Examiner* — Scott J Walthour
(74) *Attorney, Agent, or Firm* — Greer, Burns & Crain, Ltd.

(57) ABSTRACT

A supply system for an aircraft arranged between two dihydrogen tanks and an engine. The supply system includes a supply module that assures the flow of dihydrogen between the tanks and an outlet pipe and two heaters mounted in series on a main pipe connected to the engine. The supply system also includes a network of pipes and solenoid valves that, in the event of a problem in one of the components of the supply system, enable dihydrogen to be redirected so as to reach the engine. Also an aircraft with such a supply system.

10 Claims, 4 Drawing Sheets

DIHYDROGEN SUPPLY SYSTEM FOR AN AIRCRAFT ENGINE

CROSS-REFERENCES TO RELATED APPLICATIONS

This application claims the benefit of French Patent Application Number 2207594 filed on Jul. 25, 2022, the entire disclosure of which is incorporated herein by way of reference.

FIELD OF THE INVENTION

The present invention concerns a dihydrogen supply assembly for an aircraft engine and an aircraft including a supply assembly of that kind.

BACKGROUND OF THE INVENTION

In order to reduce the emissions of carbon dioxide ($CO_2$) from aircraft engines it is known to use dihydrogen as fuel. The aircraft then includes a main supply system that includes tanks of liquid dihydrogen. To be used by the engines the dihydrogen must be in gaseous form and to this end the main supply system includes heaters that heat the dihydrogen. To feed the dihydrogen from the tank to the engine the main supply system includes a network of pipes, pumps and valves leading from the tanks to the engines via the heaters.

The dihydrogen supply must be assured even if one of the components of the main supply system is affected by an incident. To this end it is known to install a redundant supply system that takes over in the event of a problem in the main supply system.

Although an arrangement of this kind offers good performance from the functional point of view it generates additional weight and complexity because of the duplication of the supply system.

It is therefore necessary to find a different arrangement that makes it possible to assure the supply of the engines with dihydrogen even in the event of an incident at the same time as limiting the weight on the aircraft.

SUMMARY OF THE INVENTION

An object of the present invention is to propose a supply system for an aircraft engine where said supply system makes it possible to assure the supply of the engine with dihydrogen from a tank even in the event of an incident affecting one of the components of said supply system.

To this end, there is proposed a supply system for an aircraft including first and second dihydrogen tanks and an engine, said supply system including:
- a supply module including a first outlet pipe, a second outlet pipe, for each tank, a feed pipe intended to be fluidically connected to said tank and means arranged to channel dihydrogen from the feed pipes to the first outlet pipe or to the second outlet pipe and, when dihydrogen is channeled to the first outlet pipe, to channel dihydrogen coming from the second outlet pipe to the first outlet pipe,
- a first heater,
- a second heater,
- a main pipe passing through the first heater and the second heater and fluidically connected between the first outlet pipe and the engine, along which there are installed, on the one hand, between the first heater and the second heater, a first three-port solenoid valve and a second three-port solenoid valve with a non-return valve disposed between the first solenoid valve and the second heater, and, on the other hand, between the second heater and the engine, a third three-port solenoid valve and a fourth three-port solenoid valve with a non-return valve disposed between the third solenoid valve and the engine, where the second solenoid valve allows flow from the first heater to the second heater but prevents flow from the second solenoid valve to the first heater, where the fourth solenoid valve allows flow from the second heater to the engine but prevents flow from the fourth solenoid valve to the second heater,
- a first branch pipe fluidically connected between the second outlet pipe and a port of the second solenoid valve,
- a second branch pipe fluidically connected between a port of the first solenoid valve and a port of the fourth solenoid valve,
- detection means for detecting a leak of hydrogen on each pipe and each heater to detect a malfunction of a heater or a solenoid valve and to deliver information representative of a leak of hydrogen or a detected malfunction, and
- a control unit arranged to control opening and closing of each solenoid valve and the means of the supply module as a function of information delivered by the detection means.

A supply system of this kind assures the supply of the engine with dihydrogen from a tank even in the event of an incident affecting one of the components of said supply system.

Advantageously, the supply system includes, for each branch pipe, a two-port regulation solenoid valve that is mounted on said branch pipe and is controlled by the control unit.

Advantageously, the supply system includes a safety pipe that is fluidically connected between a port of the third solenoid valve and the engine.

In accordance with one particular embodiment, each feed pipe is equipped with a pump, and the supply module includes:
- an upstream pipe fluidically connected between the feed pipes,
- a downstream pipe fluidically connected between the first outlet pipe and the second outlet pipe,
- a first connecting pipe and a second connecting pipe fluidically connected in parallel between the upstream pipe and the downstream pipe, where the first connecting pipe is equipped with a pump, where the second connecting pipe is equipped with a two-port regulation solenoid valve,
- a fifth two-port solenoid valve mounted on the upstream pipe between the pump of the feed pipe of the second tank and the first connecting pipe,
- a sixth two-port solenoid valve mounted on the upstream pipe between the first connecting pipe and the second connecting pipe,
- a seventh two-port solenoid valve mounted on the upstream pipe between the pump of the feed pipe of the first tank and the second connecting pipe,
- an eighth two-port solenoid valve mounted on the downstream pipe between the second outlet pipe and the first connecting pipe,
- a ninth two-port solenoid valve mounted on the downstream pipe between the first connecting pipe and the second connecting pipe, and a tenth two-port solenoid valve mounted on the downstream pipe between the first outlet pipe and the second connecting pipe.

In accordance with another particular embodiment, each feed pipe is equipped with a pump, and the supply module includes:

an upstream pipe fluidically connected between the feed pipes, a downstream pipe fluidically connected between the first outlet pipe and the second outlet pipe, a first connecting pipe and a second connecting pipe fluidically connected in parallel between the upstream pipe and the downstream pipe, where the first connecting pipe is equipped with a pump, where the second connecting pipe is equipped with a two-port regulation solenoid valve, a fifth three-port solenoid valve with a port fluidically connected to the feed pipe of the second tank, a port fluidically connected to the upstream pipe and a port fluidically connected to the first connecting pipe, a sixth three-port solenoid valve with a port fluidically connected to the feed pipe of the first tank, a port fluidically connected to the downstream pipe and a port fluidically connected to the second connecting pipe, a seventh three-port solenoid valve with a port fluidically connected to the second outlet pipe, a port fluidically connected to the upstream pipe and a port fluidically connected to the first connecting pipe, and an eighth three-port solenoid valve with a port fluidically connected to the first outlet pipe, a port fluidically connected to the downstream pipe and a port fluidically connected to the second connecting pipe.

Advantageously, the supply system includes at least one sealed box arranged around the first or second heater, said box having the main pipe passing through it.

Advantageously, the main pipe is a double-skin pipe comprising an inner skin surrounded by an outer skin, and the detection means include a dihydrogen detector disposed between the inner and outer skins of the main pipe.

Advantageously, the detection means include a dihydrogen detector disposed in the box.

Advantageously, the box is filled with an inert gas or under vacuum.

The invention also proposes an aircraft including first and second dihydrogen tanks, at least one engine and, for each engine, a supply system conforming to any of the above variants where each feed pipe is fluidically connected to the first or second tank and where the main pipe is fluidically connected to the engine.

BRIEF DESCRIPTION OF THE DRAWINGS

The features of the invention referred to hereinabove and others will become more clearly apparent on reading the following description of one embodiment, said description being given with reference to the appended drawings, in which.

DETAILED DESCRIPTION OF THE PREFERRED EMBODIMENTS

Figure 1:
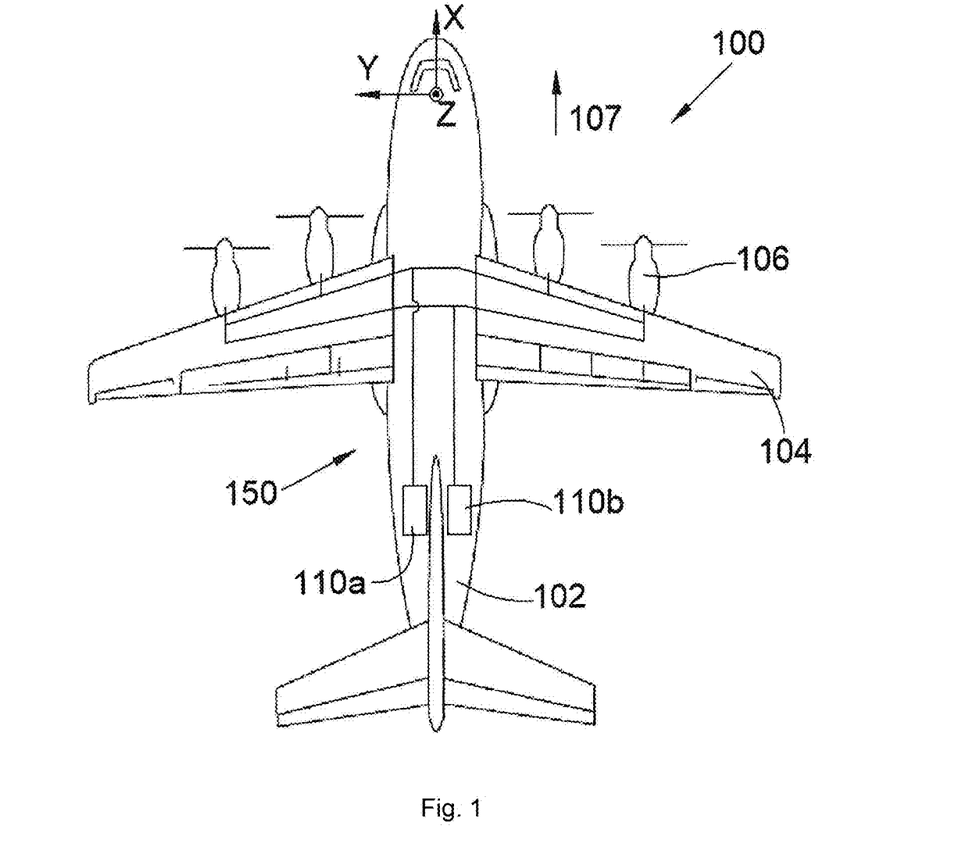
FIG. 1 is a view from above of an aircraft according to the invention.

In the following description terms relating to a position are given with reference to an aircraft in the normal position of flight, that is to say as represented in FIG. 1.

In the following description, and by convention, the longitudinal direction of the aircraft is denoted X, the transverse direction that is horizontal when the aircraft is on the ground is denoted Y, and the vertical direction that is vertical when the aircraft is on the ground is denoted Z, these three directions X, Y and Z being mutually orthogonal.

FIG. 1 shows an aircraft 100 that includes a fuselage 102 to each side of which is fixed a wing 104 that carries at least one engine 106 using dihydrogen as fuel. In the embodiment of the invention shown in FIG. 1 the engine 106 is a propeller engine but any other type of engine may be envisaged.

The arrow 107 indicates the direction of forward movement of the aircraft 100.

The aircraft 100 includes a first tank 110a and a second tank 110b in which dihydrogen is stored in liquid form. In this embodiment of the invention the two tanks 110a-b are disposed at the rear of the fuselage 102, but a different position is possible.

The aircraft 100 also includes a supply system 150 that provides a fluidic connection between the tanks 110a-b and each engine 106.

Figure 2:
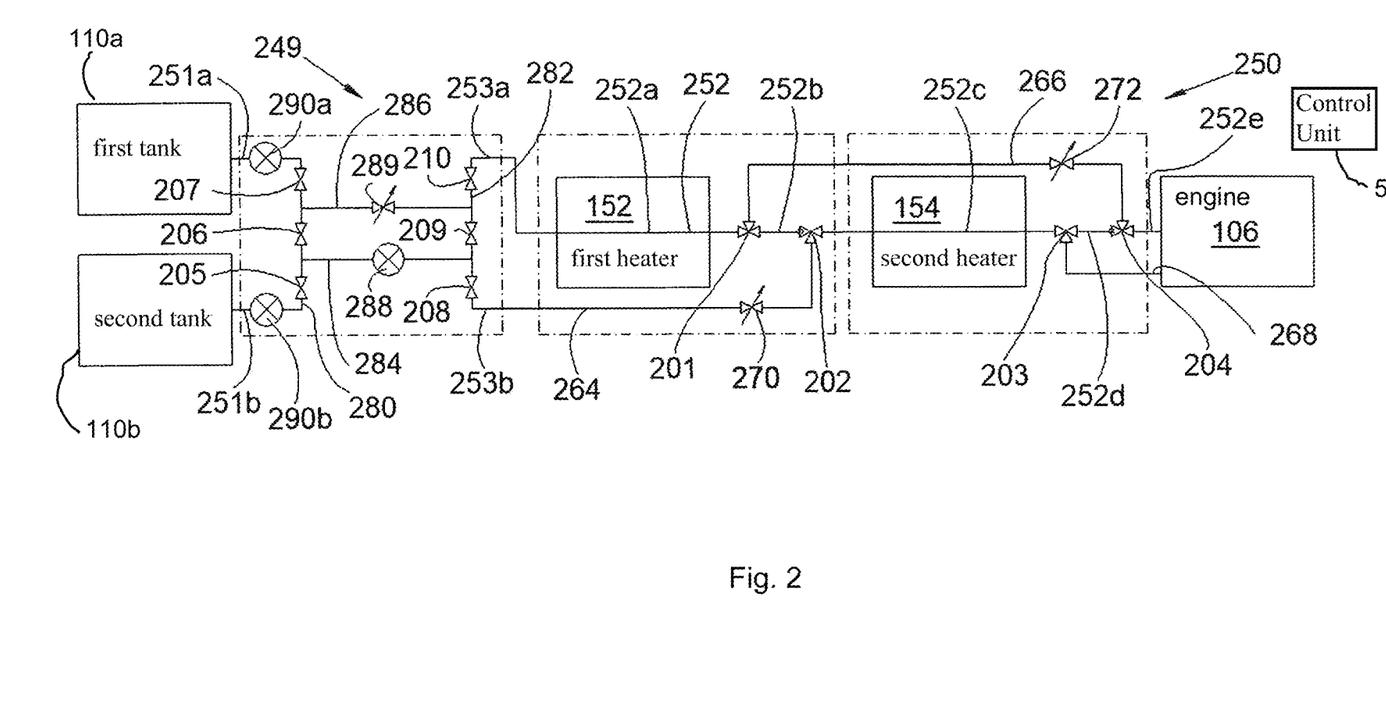
FIG. 2 is a schematic representation of a supply system in accordance with a first embodiment of the invention.
Figure 3:
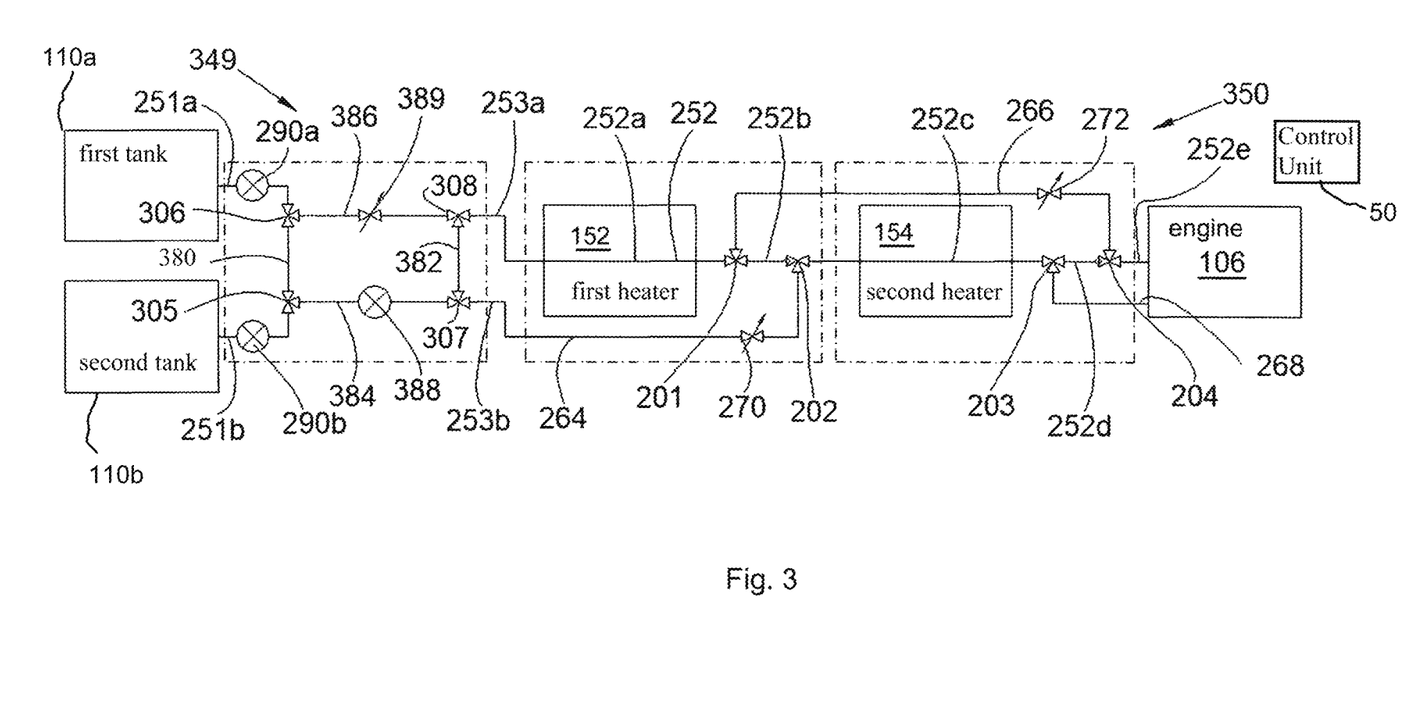
FIG. 3 is a schematic representation of a supply system in accordance with a second embodiment of the invention.

FIG. 2 shows a supply system 250 in accordance with a first embodiment and FIG. 3 shows a supply system 350 in accordance with a second embodiment.

The supply system 250, 350 is arranged between the two tanks 110a-b and an engine 106 and there is then a supply system 250, 350 of this kind for each engine 106.

To heat the dihydrogen to convert it to the gaseous phase the supply system 250, 350 includes a first heater 152 in series with a second heater 154. A heater 152, 154 of this kind is for example a heat exchanger that exchanges heat energy between a heat transfer fluid and the cold dihydrogen or a system with a resistive heating element. Of course, the supply system 250 may include a single heater or more than two heaters.

In some flight phases it may be necessary to regulate the temperature of the dihydrogen and to compensate a drop in temperature of the heat source of the heater and to this end recirculation loops are provided to take up some of the dihydrogen at the exit of a heater 152, 154 and to re-inject it at the inlet of the same heater 152, 154 in order to mix it with the dihydrogen not yet heated. This kind of mixture makes it possible to compensate a drop in temperature of the heat source of the heater in order to limit the variation of temperature of the dihydrogen at the exit of the heater. As explained hereinafter, in the event of an incident each recirculation loop may be converted into a branch loop that transports dihydrogen to the engine 106, which avoids the need to duplicate the dihydrogen transport pipes.

The supply system 250, 350 includes a supply module 249, 349 that is different for the two embodiments and includes means for taking up liquid dihydrogen in the two tanks 110a-b and feeding the heaters 152 and 154 and then the engine 106. These means may take the form of pipes on which pumps are disposed, and possibly solenoid valves, in order to take up dihydrogen from the tanks 110a-b and to feed the heaters 152 and 154 and the engine 106. The pipes in which the dihydrogen circulates may be single-skin or double-skin pipes.

The supply module 249, 349 includes for each tank 110a-b a feed pipe 251a-b fluidically connected to said tank 110a-b. The supply module 249, 349 also includes a first outlet pipe 253a and a second outlet pipe 253b.

The supply module 249, 349 also includes means for channeling the dihydrogen from the feedpipes 251a-b to the first outlet pipe 253a or the second outlet pipe 253b. These means may take the form of pipes on which solenoid valves are disposed in order to allow or to prevent the dihydrogen from circulating between the feed pipes 251a-b and the outlet pipes 253a-b.

When the dihydrogen is channeled to the first outlet pipe 253a the means of the supply module 249, 349 are arranged to channel the dihydrogen coming from the second outlet pipe 253b to the first outlet pipe 253a in order to loop at the entry of the first heater 152.

The supply system 250, 350 includes a main pipe 252 that passes through the first heater 152 and the second heater 154 and is fluidically connected between the first outlet pipe 253a and the engine 106.

There are installed along the main pipe 252 between the first heater 152 and the second heater 154 a first three-port solenoid valve 201 and a second three-port solenoid valve 202 with a non-return valve. The second solenoid valve 202 is disposed between the first solenoid valve 201 and the second heater 154.

There are installed along the main pipe 252 between the second heater 154 and the engine 106 a third three-port solenoid valve 203 and a fourth three-port solenoid valve 204 with a non-return valve. The fourth solenoid valve 204 is disposed between the third solenoid valve 203 and the engine 106.

The main pipe 252 is therefore divided into a first part 252a between the first outlet pipe 253a and the first solenoid valve 201 via the first heater 152, a second part 252b between the first solenoid valve 201 and the second solenoid valve 202, a third part 252c between the second solenoid valve 202 and the third solenoid valve 203 via the second heater 154, a fourth part 252d between the third solenoid valve 203 and the further solenoid valve 204, and a fifth part 252e between the fourth solenoid valve 204 and the engine 106.

The first solenoid valve 201 has a port fluidically connected to the first part 252a and a port fluidically connected to the second part 252b.

The second solenoid valve 202 has a port fluidically connected to the second part 252b and a port fluidically connected to the third part 252c.

The third solenoid valve 203 has a port fluidically connected to the third part 252c and a port fluidically connected to the fourth part 252d.

The fourth solenoid valve 204 has a port fluidically connected to the fourth part 252d and a port fluidically connected to the fifth part 252e.

The second solenoid valve 202 allows flow from the first heater 152 to the second heater 154 but prevents flow in the second part 252b from the second solenoid valve 202 to the first heater 152. It is therefore the port that is fluidically connected to the second part 252b that includes a non-return valve.

The fourth solenoid valve 204 allows flow from the second heater 154 to the engine 106 but prevents flow in the fourth part 252d from the fourth solenoid valve 204 to the second heater 154. It is therefore the port that is fluidically connected to the fourth part 252d that includes a non-return valve.

The supply system 250, 350 includes a first branch pipe 264 that is fluidically connected between the second outlet pipe 253b and a port of the second solenoid valve 202.

The supply system 250, 350 includes a second branch pipe 266 that is fluidically connected between a port of the first solenoid valve 201 and a port of the fourth solenoid valve 204.

Each solenoid valve 201, 202, 203, 204 is opened and closed under the control of a control unit 50 of the supply system 250, 350 as a function of what is required. In the same manner the means of the supply module 249, 349 are under the control of the control unit 50 so that dihydrogen flows from the first outlet pipe 253a or the second outlet pipe 253b.

In normal operation dihydrogen is channeled by the supply module 249, 349 to the first outlet pipe 253a and then flows in the main pipe 252 to the engine 106. The ports of each solenoid valve 201, 202, 203, 204 that are fluidically connected to the main pipe 252 are open.

At the same time, if necessary, dihydrogen is taken up at the level of the second solenoid valve 202 to be channeled to the second outlet 253b via the first branch pipe 264 in order to be reintroduced into the first outlet pipe 253a and to be mixed with dihydrogen coming from the tanks 110a-b and to pass through the first heater 152 again. Depending on the situation, the port of the second solenoid valve 202 fluidically connected to the first branch 264 is open or closed.

At the same time, if necessary, dihydrogen is taken up at the level of the fourth solenoid valve 204 to be channeled to the first solenoid valve 201 via the second branch pipe 266 in order to be reintroduced into the main pipe 252 and to be mixed with dihydrogen coming from the first heater 152 and to pass through the second heater 154 again. Depending on the situation, the port of the fourth solenoid valve 204 fluidically connected to the second branch pipe 266 and the port of the first solenoid valve 201 fluidically connected to the second branch pipe 266 are open or closed.

In the event of an incident at the level of the first pipe 252a or of the first heater 152 the control unit 50 causes the supply module 249, 349 to deliver dihydrogen at the level of the second outlet pipe 253b, the port of the first solenoid valve 201 fluidically connected to the first part 252a to be closed and the port of the second solenoid valve 202 fluidically connected to the first branch pipe 264 to be opened. Dihydrogen then flows from the second outlet pipe 253b through the first branch pipe 264 to the second solenoid valve 202 to rejoin the second part 252b going to the engine 106 via the normal route. There is then no recirculation at the level of the first branch pipe 264. The other channels fluidically connected to the main pipe 252 are open and as before circulation can be achieved in the second branch pipe 266.

In the event of an incident at the level of the first branch pipe 264 the control unit 50 causes the port of the second solenoid valve 202 fluidically connected to the first branch pipe 264 to be closed. The dihydrogen then follows the normal path but there is no recirculation via the first branch pipe 264. The channels fluidically connected to the main pipe 252 are open and as before recirculation can be achieved in the second branch pipe 266.

In the event of an incident at the level of the third part 252c or of the second heater 154 the control unit 50 causes the port of the second solenoid valve 202 and the port of the third solenoid valve 203 that are fluidically connected to the third part 252c to be closed and the port fluidically connected to the second branch pipe 266 to be opened. Dihydrogen then flows from the first solenoid valve 201 through the second branch pipe 266 to reach the engine 106 via the fourth solenoid valve 204. There is then no recirculation at the level of the second branch pipe 266. The other channels fluidically connected to the main pipe 252 are open and as before recirculation can be achieved in the first branch pipe 264.

In the event of an incident at the level of the second branch pipe 266 the control unit 50 causes the port of the first solenoid valve 201 fluidically connected to the second branch pipe 266 to be closed and the port of the fourth solenoid valve 204 fluidically connected to the second branch pipe 266 to be closed. The dihydrogen then follows the normal path but there is no recirculation via the second branch pipe 266. The channels fluidically connected to the main pipe 252 are open and as before recirculation can be achieved in the first branch pipe 264.

Accordingly, with an arrangement of this kind, even in the event of an incident, for example a fault, affecting one of the components of the supply system 250, 350 dihydrogen reaches the engine 106 via at least the heaters 152, 154 without it being necessary to install a redundant system.

In the embodiment of the invention described here the supply system 250, 350 includes a safety pipe 268 that is fluidically connected between a port of the first solenoid valve 203 and the engine 106 to supply the engine even in the event of a problem in the fourth part 252d or the fifth part 252e.

To regulate the flowrate in the branch channels 264 and 266 the supply system 250, 350 includes for each branch pipe 264, 266 a two-port regulation solenoid valve 270, 272 that is mounted on said branch pipe 264, 266. Thus, each branch pipe 264, 266 is in two parts on respective opposite sides of the regulation solenoid valve 270, 272 which includes, for each part, a port fluidically connected to said part. These solenoid valves 270 and 272 are also controlled by the control unit 50 which enables regulation of the flowrate of dihydrogen in the branch pipe 264, 266 and therefore the quantity of dihydrogen that will circulate in the main port 252; moreover, the flowrate will be different in the normal operating mode and in the event of an incident.

The regulation solenoid valve 270, 272 may be integrated into the second solenoid valve 202 at the level of the port fluidically connected to the first branch pipe 264 or the fourth solenoid valve 204 at the level of the port fluidically connected to the second branch pipe 266, respectively.

For the control unit 50 to control the various components as a function of circumstances, the supply system 250, 350 includes detection means for detecting a leak of hydrogen on each pipe and each heater 152, 154 to detect a malfunction of a heater 152, 154 or of a solenoid valve.

These detection means are then designed to alert the control unit 50 which will then control the components of the supply system 250, 350 accordingly.

To detect a malfunction of a heater 152, 154 or of a solenoid valve or of a pump the detection means for example take the form of a surveillance system integrated into said heater 152, 154 or the solenoid valve or the pump. For example, for a heater containing a heat transfer fluid circulating in said heater the surveillance system may comprise a pressure sensor configured to detect a variation (for example a decrease) of the pressure of the heat transfer fluid circulating in the heater. In accordance with another example the surveillance system comprises a temperature sensor configured to detect the temperature of the dihydrogen at the exit from the heater and to send that detected temperature to a comparator, the comparator being configured to verify that the detected temperature is in a predetermined temperature range and to issue an alert if the detected temperature is outside the predetermined temperature range.

To detect a leak of dihydrogen at the level of a pipe it is possible to use double-skin pipes with an inner skin surrounded by an outer skin where the dihydrogen circulates in the inner skin and the detection means for example take the form of dihydrogen sensors or detectors disposed between the two skins in order to detect the presence of dihydrogen if the inner skin is leaking.

To detect a leak of dihydrogen at the level of a heater 152, 154 it is possible to enclose each heater 152, 154 in a sealed box in which the detection means take for example the form of a dihydrogen detector arranged in said box.

A dihydrogen sensor may be installed in order to detect the presence of dihydrogen outside the supply system 250, 350, that is to say otherwise than at a pump, a solenoid valve or a heater, a dihydrogen sensor can be installed.

In the first embodiment of the invention the supply module 249 includes an upstream pipe 280 and a downstream pipe 282. The upstream pipe 280 is fluidically connected between the feed pipes 251a and 251b and the downstream pipe 282 is fluidically connected between the first outlet pipe 253a and the second outlet pipe 253b.

The supply module 249 also includes a first connecting pipe 284 and a second connecting pipe 286. The first connecting pipe 284 and the second connecting pipe 286 are fluidically connected in parallel between the upstream pipe 280 and the downstream pipe 282.

The first connecting pipe 284 is equipped with a pump 288 that moves the dihydrogen in said first connecting pipe 284 from the upstream pipe 280 to the downstream pipe 282.

Each feed pipe 251a-b is equipped with a pump 290a-b that moves the dihydrogen from the feed pipe 251a-b to the upstream pipe 280.

Each pump 288, 290a-b is controlled by the control unit 50.

The second connecting pipe 286 is equipped with a two-port regulation solenoid valve 289 controlled by the control unit 50.

The upstream pipe 280 is equipped with a fifth two-port solenoid valve 205, a sixth two-port solenoid valve 206 and a seventh two-port solenoid valve 207. The fifth solenoid valve 205 is disposed between the pump 290b of the feed pipe 251b of the second tank 110b and the first connecting pipe 284. The sixth solenoid valve 206 is disposed between the first connecting pipe 284 and the second connecting pipe 286. The seventh solenoid valve 207 is disposed between the pump 290a of the feed pipe 251a of the first tank 110a and the second connecting pipe 286.

The downstream pipe 282 is equipped with an eighth two-port solenoid valve 208, a ninth two-port solenoid valve 209 and a tenth two-port solenoid valve 210. The eighth solenoid valve 208 is disposed between the second outlet pipe 253b and the first connecting pipe 284. The ninth solenoid valve 209 is disposed between the first connecting pipe 284 and the second connecting pipe 286. The tenth solenoid valve 210 is disposed between the first outlet pipe 253a and the second connecting pipe 286.

Each of the solenoid valves equipping the upstream pipe 280 and the downstream pipe 282 is controlled by the control unit 50.

In normal operation the solenoid valves mounted on the upstream pipe 280 and the downstream pipe 282 are open. Dihydrogen circulates from the tanks 110a-b to the upstream pipe 280 to be channeled to the first connecting pipe 284 and then the downstream pipe 282 in order to rejoin the first outlet pipe 253a.

At the same time, if necessary, dihydrogen from the first branch pipe 264 is reinjected at the level of the eighth solenoid valve 208.

At the same time, if necessary, dihydrogen is taken up between the ninth solenoid valve 209 and the tenth solenoid valve 210 via the second connecting pipe 286 and the quantity taken up is regulated by the regulation solenoid valve 289.

In the event of an incident at the level of the first part 252a or of the first heater 152 the control unit 50 causes the tenth solenoid valve 210 to be closed and dihydrogen is then channeled to the second outlet pipe 253b. The other solenoid valves of the supply module 249 are open and recirculation can be achieved in the second connecting pipe 286.

In the event of an incident at the level of the first connecting pipe 284 or of the pump 288 that is installed thereon the control unit 50 causes the fifth solenoid valve 205, the sixth solenoid valve 206, the eighth solenoid valve 208 and the ninth solenoid valve 209 to be closed in order to isolate the first connecting pipe 284 and the pump 288. Dihydrogen then passes through the second connecting pipe 286 to rejoin the first outlet pipe 253a.

In the event of an incident at the level of the second connecting pipe 286 or of the solenoid valve 289 that is installed thereon the control unit 50 causes the sixth solenoid valve 206, the seventh solenoid valve 207, the ninth solenoid valve 209 and the tenth solenoid valve 210 to be closed in order to isolate the second connecting pipe 286 and the regulation solenoid valve 289. Dihydrogen then passes through the first connecting pipe 284 to rejoin the first outlet pipe 253a.

In the second embodiment of the invention the supply module 349 includes an upstream pipe 380 and a downstream pipe 382. The upstream pipe 380 is fluidically connected between the feed pipes 251a and 251b and the downstream pipe 382 is fluidically connected between the first outlet pipe 253a and the second outlet pipe 253b.

The supply module 349 also includes a first connecting pipe 384 and a second connecting pipe 386. The first connecting pipe 384 and the second connecting pipe 386 are fluidically connected in parallel between the upstream pipe 380 and the downstream pipe 382.

The first connecting pipe 384 is equipped with a pump 388 that moves the dihydrogen in said first connecting pipe 384 from the upstream pipe 380 to the downstream pipe 382.

Each feed pipe 251a-b is equipped with a pump 290a-b that moves the dihydrogen from the feed pipe 251a-b to the upstream pipe 380.

Each pump 388, 290a-b is controlled by the control unit 50.

The second connecting pipe 386 is equipped with a two-port regulation solenoid valve 389 controlled by the control unit 50.

The supply module 349 includes a fifth three-port solenoid valve 305, a sixth three-port solenoid valve 306, a seventh three-port solenoid valve 307 and an eighth three-port solenoid valve 308.

For the fifth solenoid valve 305 one port is fluidically connected to the feed pipe 251b of the second tank 110b, one port is fluidically connected to the upstream pipe 380, and one port is fluidically connected to the first connecting pipe 384.

For the sixth solenoid valve 306 one port is fluidically connected to the feed pipe 251a of the first tank 110a, one port is fluidically connected to the upstream pipe 380 and one port is fluidically connected to the second connecting pipe 386.

For the seventh solenoid valve 307 one port is fluidically connected to the second outlet pipe 253b, one port is fluidically connected to the downstream pipe 382 and one port is fluidically connected to the first connecting pipe 384.

For the eighth solenoid valve 308 one port is fluidically connected to the first downstream pipe 253a, one port is fluidically connected to the downstream pipe 382 and one port is fluidically connected to the second connecting pipe 386.

Each of the solenoid valves mounted on the upstream pipe 380 and the downstream pipe 382 is controlled by the control unit 50.

In normal operation the solenoid valves mounted on the upstream pipe 380 and the downstream pipe 382 are open. Dihydrogen circulates from the tanks 110a-b to the upstream pipe 380 to be channeled to the first connecting pipe 384 and then to the downstream channel 382 in order to rejoin the first outlet pipe 253a.

At the same time, if necessary, dihydrogen coming from the first branch pipe 264 is reinjected at the level of the seventh solenoid valve 307.

At the same time, if necessary, dihydrogen is taken up at the eighth solenoid valve 308 via the second connecting pipe 386 and the quantity taken up is regulated by the regulation solenoid valve 389.

In the event of an incident at the level of the first part 252a or of the first heater 152 the control unit 50 causes the eighth solenoid valve 308 to be closed and dihydrogen is then channeled to the second outlet pipe 253b. The other solenoid valves of the supply module 349 are opened and recirculation can be achieved in the second connecting pipe 386.

In the event of an incident at the level of the first connecting pipe 384 or the pump 388 that is installed thereon the control unit 50 causes the port of the fifth solenoid valve 305 fluidically connected to the first connecting pipe 384 to be closed and the port of the seventh solenoid valve 307 fluidically connected to the first connecting pipe 384 to be closed. The other ports of the fifth solenoid valve 305 and of the seventh solenoid valve 307 as well as the other solenoid valves 306, 308 remain open.

The first connecting pipe 384 is therefore isolated. Dihydrogen then rejoins the first outlet pipe 253a via the second connecting pipe 386.

In the event of an incident at the level of the second connecting pipe 386 or of the regulation solenoid valve 389 that is installed thereon, the control unit 50 causes the port of the sixth solenoid valve 306 fluidically connected to the second connecting pipe 386 to be closed and the port of the eighth solenoid valve 308 fluidically connected to the second connecting pipe 386 to be closed. The other ports of the sixth solenoid valve 306 and the eighth solenoid valve 308 as well as the other solenoid valves 305, 307 remain open.

The second connecting pipe 386 is therefore isolated. The dihydrogen then rejoins the first outlet pipe 253a via the first branch connection 384.

Figure 4:
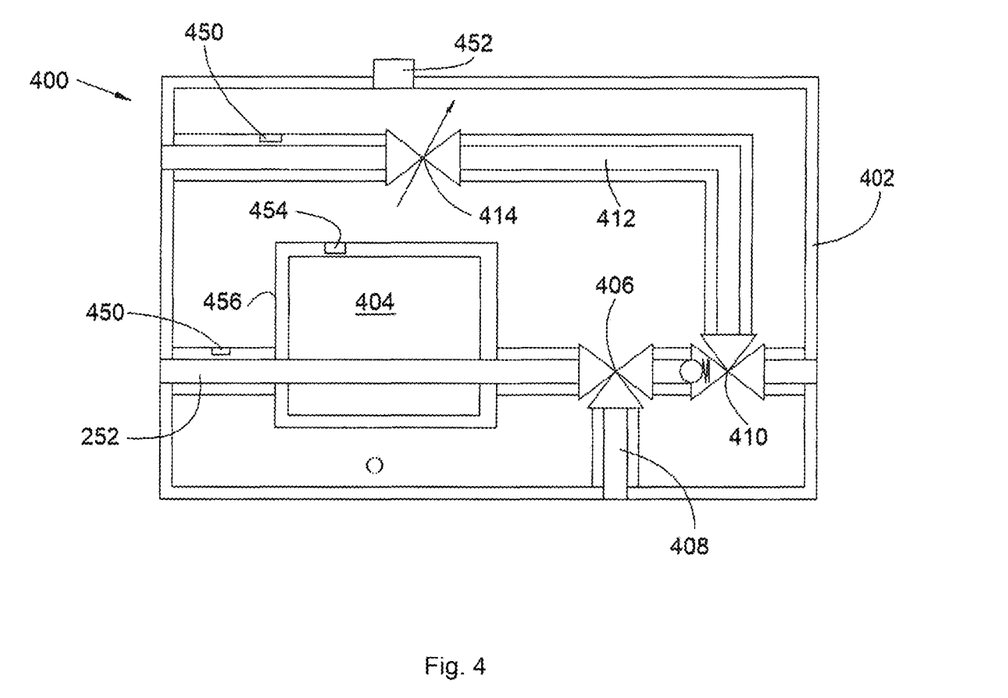
FIG. 4 is a schematic representation of a module of the supply system according to the invention.

FIG. 4 shows a module 400 that may be used in the supply system 250, 350 according to the invention. Here the module 400 includes a sealed box 402 in which is installed a heater 404 that can be the first or the second heater 152, 154 and that has passing through it the main pipe 252 which projects out of the box 402 on either side.

The module 400 also includes a three-port solenoid valve 406 on the main pipe 252 at the outlet of the heater 404. The outlet solenoid valve 406 may be the first solenoid valve 201 or the third solenoid valve 203 and has two ports fluidically connected to the main pipe 252.

Inside the module 400 there is also a first pipe 408 that is fluidically connected to the third port of the outlet solenoid valve 406 and which, depending on the situation, is the branch pipe 266 or the safety pipe 268.

The module 400 includes downstream of the outlet solenoid valve 406 a three-port solenoid valve 410 in series with a non-return valve on the main pipe 252. The solenoid valve 410 in series has two ports fluidically connected to the main pipe 252 where the channel including the non-return valve is fluidically connected to the part of the main pipe 252 coming from the outlet solenoid valve 406. Depending on the situation, the solenoid valve 410 in series is the second solenoid valve 202 or the fourth solenoid valve 204.

The module 400 also includes a branch pipe 412 that is fluidically connected to a third port of the solenoid valve 410 in series and discharges outside the box 402. Depending on the situation, the branch pipe 412 may be the first branch pipe 264 or the second branch pipe 266.

A regulation solenoid valve 414 is installed on the branch pipe 412.

As discussed hereinabove, each pipe 252, 412 may consist of a double skin with an inner skin surrounded by an outer skin where dihydrogen circulates in the inner skin and the detection means 450 take for example the form of dihydrogen detectors disposed between the two skins.

Here another dihydrogen detector 452 is disposed at the level of the box 402 to detect leaks into the box 402. An overpressure evacuation valve or an overpressure rupturable disc may be disposed at the level of the box 402 and connected to an evacuation pipe to the outside of the box 402 in order to stabilize the pressure in the box 402 in the event of a possible leak into the box 402, which would cause an overpressure.

Here another dihydrogen detector 454 is disposed in a sealed box 456 in which the heater 404 is housed.

The box 402 may be filled with an inert gas such as dinitrogen for example. Alternatively the box 402 may be under vacuum.

In accordance with one embodiment the control unit 50 includes, connected by a communication bus: a processor or central processing unit (CPU); a random-access memory (RAM); a read-only memory (ROM); a storage unit such as a hard disc or a storage medium reader such as a secure digital (SD) card reader; at least one communication interface for example enabling the control unit to communicate with the solenoid valves, the pumps, etc.

The processor is able to execute instructions loaded into the RAM from the ROM, from an external memory (not represented), from a storage medium (such as an SD card) or from a communication network. When the equipment is powered up the processor is able to read and to execute instructions from the RAM. These instructions form a computer program causing the processor to execute some or all of the algorithms and steps described.

All or some of the algorithms and steps described hereinafter may be implemented in software form by execution of a set of instructions by a programmable machine, for example a digital signal processor (DSP) or a microcontroller, or implemented in hardware form by a dedicated component or machine, for example a field-programmable gate array (FPGA) or an application-specific integrated circuit (ASIC).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A supply system for an aircraft including a first dihydrogen tank and a second dihydrogen tank and at least one engine, said supply system comprising:
   a supply module including a first outlet pipe, a second outlet pipe, a first feed pipe, and a second feed pipe, the first feed pipe and the second feed pipe configured to be fluidically connected to said first dihydrogen tank and said second dihydrogen tank, respectively, and a supply means arranged to channel dihydrogen from the first feed pipe and the second feed pipe to the first outlet pipe or the second outlet pipe and, when dihydrogen is channeled to the first outlet pipe, to channel dihydrogen coming from the second outlet pipe to the first outlet pipe,
   a first heater,
   a second heater,
   a main pipe passing through the first heater and the second heater and fluidically connected between the first outlet pipe and the at least one engine, wherein along the main pipe there are installed, between the first heater and the second heater, a first three-port solenoid valve and a second three-port solenoid valve with a non-return valve disposed between the first three-port solenoid valve and the second heater, and, between the second heater and the at least one engine, a third three-port solenoid valve and a fourth three-port solenoid valve with a non-return valve disposed between the third three-port solenoid valve and the at least one engine, wherein the second three-port solenoid valve allows flow from the first heater to the second heater and prevents flow from the second three-port solenoid valve to the first heater, wherein the fourth three-port solenoid valve allows flow from the second heater to the at least one engine and prevents flow from the fourth three-port solenoid valve to the second heater,
   a first branch pipe fluidically connected between the second outlet pipe and a port of the second three-port solenoid valve,
   a second branch pipe fluidically connected between a port of the first three-port solenoid valve and a port of the fourth three-port solenoid valve,
   detection means for detecting a leak of dihydrogen on each pipe and each heater to detect a malfunction of a heater or a solenoid valve and to deliver information representative of a leak of dihydrogen, and
   a control unit configured to control opening and closing of each of the first three-port solenoid valve, the second three-port solenoid valve, the third three-port solenoid valve, the fourth three-port solenoid valve and the supply means as a function of the information delivered by the detection means.

2. The supply system according to claim 1, further comprising a first two-port regulation solenoid valve mounted on said first branch pipe and a second two-port regulation solenoid valve mounted on said second branch pipe, wherein the first two-port regulation solenoid valve and the second two-port regulation solenoid valve are controlled by the control unit.

3. The supply system according to claim 1, further comprising:
a safety pipe fluidically connected between a port of the third three-port solenoid valve and the at least one engine.

4. The supply system according to claim 1, wherein each of the first feed pipe and the second feed pipe is equipped with a respective pump, and wherein the supply module further comprises:
an upstream pipe fluidically connected between the first feed pipe and the second feed pipe,
a downstream pipe fluidically connected between the first outlet pipe and the second outlet pipe,
a first connecting pipe and a second connecting pipe fluidically connected in parallel between the upstream pipe and the downstream pipe, wherein the first connecting pipe is equipped with a pump, wherein the second connecting pipe is equipped with a two-port regulation solenoid valve,
a fifth two-port solenoid valve mounted on the upstream pipe between the pump of the second feed pipe and the first connecting pipe,
a sixth two-port solenoid valve mounted on the upstream pipe between the first connecting pipe and the second connecting pipe,
a seventh two-port solenoid valve mounted on the upstream pipe between the pump of the first feed pipe and the second connecting pipe,
an eighth two-port solenoid valve mounted on the downstream pipe between the second outlet pipe and the first connecting pipe,
a ninth two-port solenoid valve mounted on the downstream pipe between the first connecting pipe and the second connecting pipe, and
a tenth two-port solenoid valve mounted on the downstream pipe between the first outlet pipe and the second connecting pipe.

5. The supply system according to claim 1, wherein each of the first feed pipe and the second feed pipe is equipped with a respective pump, and wherein the supply module further comprises:
an upstream pipe fluidically connected between the first feed and the second feed pipe,
a downstream pipe fluidically connected between the first outlet pipe and the second outlet pipe,
a first connecting pipe and a second connecting pipe fluidically connected in parallel between the upstream pipe and the downstream pipe, wherein the first connecting pipe is equipped with a pump, wherein the second connecting pipe is equipped with a two-port regulation solenoid valve,
a fifth three-port solenoid valve with a port fluidically connected to the second feed pipe, a port fluidically connected to the upstream pipe and a port fluidically connected to the first connecting pipe,
a sixth three-port solenoid valve with a port fluidically connected to the first feed pipe, a port fluidically connected to the upstream pipe and a port fluidically connected to the second connecting pipe,
a seventh three-port solenoid valve with a port fluidically connected to the second outlet pipe, a port fluidically connected to the downstream pipe and a port fluidically connected to the first connecting pipe, and
an eighth three-port solenoid valve with a port fluidically connected to the first outlet pipe, a port fluidically connected to the downstream pipe and a port fluidically connected to the second connecting pipe.

6. The supply system according to claim 1, wherein said supply system includes at least one sealed box arranged around the first heater or the second heater, said at least one sealed box having the main pipe passing therethrough.

7. The supply system according to claim 6, wherein the main pipe is a double-skin pipe comprising an inner skin surrounded by an outer skin, and wherein the detection means includes a dihydrogen detector disposed between the inner skin and the outer skin of the main pipe.

8. The supply system according to claim 6, wherein the detection means include a dihydrogen detector disposed in the at least one sealed box.

9. The supply system according to claim 6, wherein the at least one sealed box is filled with an inert gas or is under vacuum.

10. An aircraft comprising:
a first dihydrogen tank and a second dihydrogen tank,
at least one engine and,
for each engine, a respective supply system according to claim 1, wherein each first feed pipe is fluidically connected to the first dihydrogen tank and each second feed pipe is fluidically connected to the second dihydrogen tank, and wherein each main pipe is fluidically connected to a respective engine of the at least one engine.

* * * * *